United States Patent
Matt et al.

[11] Patent Number: 6,076,625
[45] Date of Patent: Jun. 20, 2000

[54] ENGINE CRADLE STRUCTURE AND ATTACHMENT

[75] Inventors: James Robert Matt, Warren; Brian Cameron Schell, Washington, both of Mich.

[73] Assignee: General Motors Corporation, Detroit, Mich.

[21] Appl. No.: 09/066,228

[22] Filed: Apr. 24, 1998

[51] Int. Cl.⁷ .................................................. B62D 21/00
[52] U.S. Cl. .................. 180/312; 180/299; 280/124.109
[58] Field of Search .................................. 180/312, 291, 180/295, 298, 299; 280/124.109

[56] References Cited

U.S. PATENT DOCUMENTS 5,573,222  11/1996  Ruehl et al. ............................. 248/647
5,862,877   1/1999  Horton et al. ........................... 180/312
5,884,722   3/1999  Durand et al. .......................... 180/312
5,915,495   6/1999  Kerlin et al. ............................ 180/291

*Primary Examiner*—Kevin Hurley
*Assistant Examiner*—Kevin McKinley
*Attorney, Agent, or Firm*—Charles E. Leahy; Kathryn A. Marra

[57] ABSTRACT

An engine cradle structure having a read lateral member and a forward cross frame attached to a body of a vehicle further includes a pair of longitudinal arms extend between the member and the frame and are further attached thereto. The longitudinal arms include a portion which curves toward a vehicle centerline near the attachment with the rear lateral member. The longitudinal arms further include a portion which curves out of a plane defined by the body of the vehicle. The curved portions cooperate to direct forces and displace the engine cradle underneath the vehicle and away from the vehicle toe pan.

2 Claims, 1 Drawing Sheet

6,076,625

1

ENGINE CRADLE STRUCTURE AND ATTACHMENT

TECHNICAL FIELD

This invention relates generally to chassis structure for a vehicle. In particular, this invention relates to an engine cradle structure and attachment.

BACKGROUND OF THE INVENTION

It is well known in the design and manufacture of vehicles to provide a structure for supporting the engine. This structure, commonly called an engine cradle, includes suitable attachment to, and cooperates with the front chassis system of the vehicle for carrying and directing loads to and from the body of the vehicle.

An engine cradle of the prior art is mounted on the underbody of a vehicle and includes a pair of longitudinal arms extending from a forward cross frame at the front of the vehicle rearward to attachment points on the body of the vehicle near the passenger compartment. The engine cradle further includes a rear lateral member rigidly mounted to the longitudinal arms. The otherwise relatively straight longitudinal arms are curved out of the plane defined by the floor of the car. The forward cross frame, vehicle body and engine cradle form the front chassis system.

The front chassis system of a vehicle reacts and transmits loads among its members to predetermined locations. For instance, loads that are transmitted into the arms from the forward cross member are partially directed out of plane by the curved portions of the arms and partially transmitted to the body of the vehicle at the attachment points.

SUMMARY OF THE INVENTION

This invention offers advantages and alternatives over the prior art by providing an engine cradle which includes specific geometry and attachments to develop predictable load paths for directing forces away from the body of a vehicle in a weight efficient and cost efficient manner.

The engine cradle and attachments of the present invention preferably includes a pair of longitudinal arms extending from a forward cross frame each arm having a curve portion directed toward the centerline of the vehicle and attaching to a rear lateral member. The rear lateral member is attached to the body of the vehicle near the passenger compartment. The preferred longitudinal arms of the engine cradle advantageously include a portion that curves out of the plane defined by the floor of the car.

The above discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings wherein like elements are numbered alike in the several Figures.

DESCRIPTION OF THE PREFERRED EMBODIMENT

Figure 1:
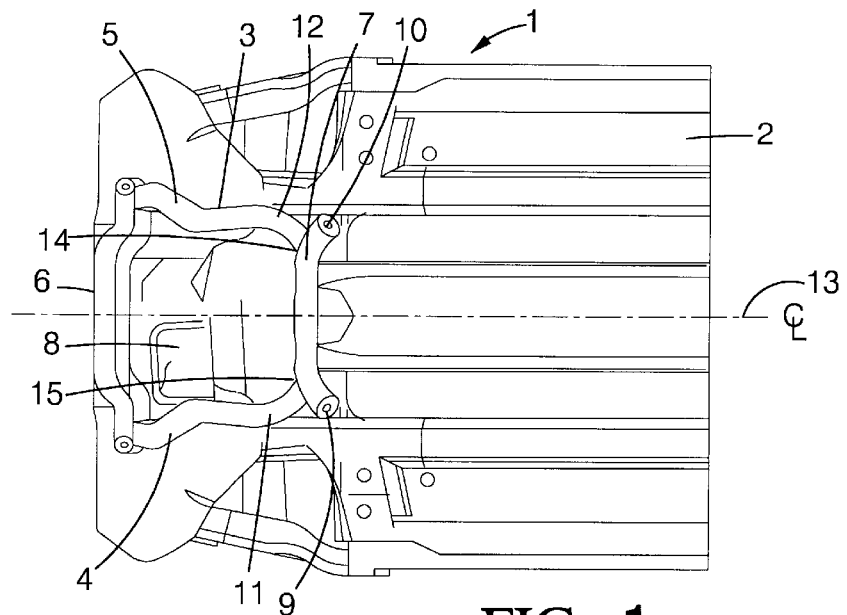
FIG. 1 is a plan view of a partial undercarriage of a vehicle showing an engine cradle.

Referring to FIG. 1 there is shown a forward portion of a vehicle undercarriage, generally designated as 1, including a

2 body 2. An engine cradle, generally designated as 3, includes longitudinal arms 4, 5 attached to forward cross frame 6 as in known in the art and is further attached to rear lateral frame 7. Rear lateral frame 7 is attached to body 2 at joints 9, 10. In normal operation of vehicle, the forces created by the weight of engine 8 are carried by longitudinal arms 4, 5 of engine cradle 3 which direct the loads to rear lateral frame 7 and to forward cross frame 6 and further into body 2.

Figure 2:
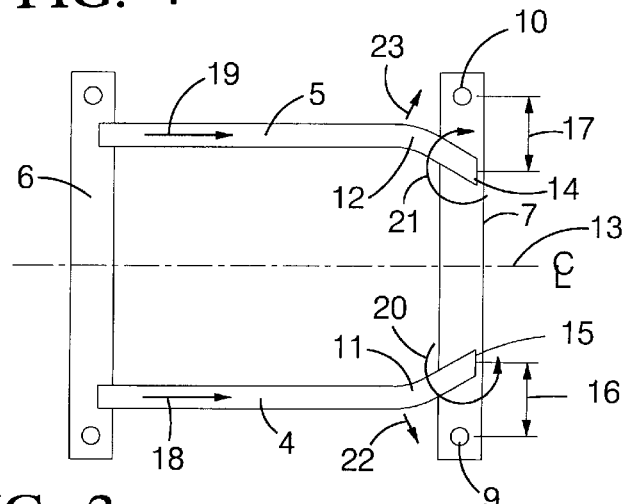
FIG. 2 is a plan view of a partial forward structure of a vehicle.

Longitudinal arms 4, 5 include curved portions, 11, 12, curving inwards toward vehicle centerline 13 near attachment points 14, 15 with rear lateral member 7. The size and location of curved portions 11, 12 in relation to attachment points 9, 10 and joints 14, 15 creates moment arms represented by the lines 16, 17 as best shown in FIG. 2. A force represented by arrows 18, 19 is directed along arms 4, 5 and creates bending moments represented by arrows 20, 21. The magnitude of the bending moments 20, 21 is a function of the magnitude of forces 18, 19 and moment arms 16, 17 as is known. The longitudinal arms 4, 5 of the present invention are sized to withstand bending caused by moments 20, 21 during normal operation. Under certain loading conditions, the magnitude of forces 18, 19 coupled with moment arms 16, 17 cause longitudinal arms 4, 5 to yield and bend under moment arms 20, 21. Curved portions 11, 12 cause longitudinal arms 4, 5 to bend outward from centerline 13 in the direction represented by arrows 22, 23 in an efficient and predictable manner.

Figure 3:
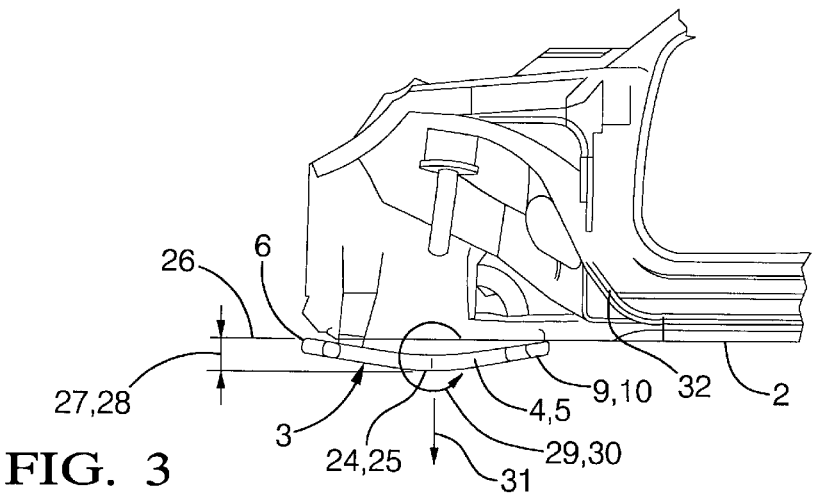
FIG. 3 is a diagrammatic representation of a structure and forces of an engine cradle.

Longitudinal arms 4, 5 of engine cradle 3 advantageously include a curved portion 24, 25 as best shown in FIG. 3 which direct the arms out of the plane of the forward cross frame 6 and the lateral rear frame 7 represented by line 26. The out of plane deflection of longitudinal arms 4, 5 establish moment arms represented by arrows 27, 28. Under normal loading moments represented by arrows 29, 30 are established and resisted by the structure of longitudinal arms 4, 5 and directed into body 2. Under certain loading conditions, as described herein above, moments 29, 30 become sufficiently large to cause longitudinal members 4, 5 to yield and displace in the direction represented by arrow 31.

Still referring to FIG. 3, the combined effects of curved portions 11, 12 and 24, 25 can be visualized. Under certain loading conditions, as described herein above, longitudinal members 4, 5 yield and bend both downward, in the direction of arrow 31, and out of the plane of the page, as viewed in FIG. 3, away from toe pan 32. The geometry of longitudinal arms 4, 5 and attachment points 14, 15 provide for rotation of the arms about the attachment points and direct the forces and displacement under the vehicle and away from the toe pan.

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An engine cradle for a vehicle having a vehicle body including a centerline, said engine cradle comprising:

a rear lateral member having ends attached to the vehicle body;

a forward cross frame;

a pair of longitudinal arm members spaced on either side of the centerline and having forward ends attached to the forward cross frame and rear ends attached to the rear lateral member, said longitudinal arm members each having a first curved portion extending toward the centerline proximate the rear end so that the rear ends of the longitudinal arms are attached to the rear lateral member inboard of the attachments of the rear lateral member to the vehicle body.

2. The engine cradle of claim 1 wherein the longitudinal arm members include a second curved portion extending downwardly intermediate the forward ends and rear ends.

* * * * *